C. SCHLUMBERGER.
LOCATION OF ORES IN THE SUBSOIL.
APPLICATION FILED SEPT. 25, 1913.

1,163,469.

Patented Dec. 7, 1915.

Witnesses
Sue M. Kerstein
Cora H. Tracy

Inventor
Conrad Schlumberger
by Max Georgii
his Attorney

UNITED STATES PATENT OFFICE.

CONRAD SCHLUMBERGER, OF PARIS, FRANCE.

LOCATION OF ORES IN THE SUBSOIL.

1,163,469.　　　　Specification of Letters Patent.　　Patented Dec. 7, 1915.

Application filed September 25, 1913. Serial No. 791,776.

*To all whom it may concern:*

Be it known that I, CONRAD SCHLUMBERGER, of 7 Rue Las Cases, Paris, France, engineer, have invented a new and useful Improvement in Location of Ores in the Subsoil, which improvement is fully set forth in the following specification.

This invention has for its object a process by which layers of conducting ores buried in the soil are discovered and studied by utilizing the phenomena of polarization which are generated at their surface in contact with the wet surrounding lands.

Layers of ores which conduct electricity as a metal (by which expression is meant the property of conducting electricity without transport or ions, whether the conductivity be small or great; many metallic ores do not conduct as a metal and only conduct electricity by reason of the moisture they contain; as is the case with rocks in general) such for example as pyrites, are in general polarized spontaneously, that is to say, they cause in the surrounding lands differences of potential which are perceptible a certain distance from the layer.

The process which forms the subject of the present invention consists—1, in revealing the existence of the metalliferous layers or masses by observing and measuring these differences of potential at the surface of the soil (or in subterranean works if such exist); 2, in to a certain degree determining the shape and dimensions of the layer by drawing up a chart of the potential.

Figure 1:
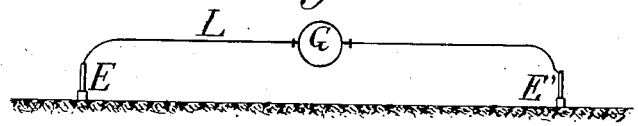
Figure 2:
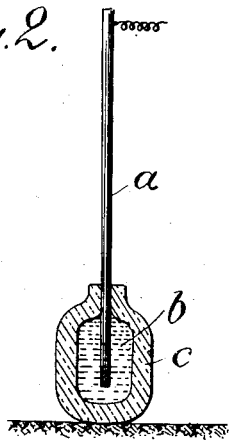
Figure 3:
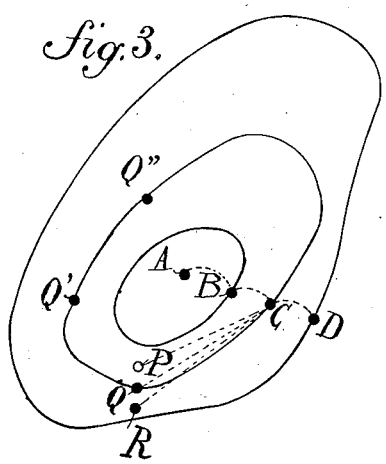

In the accompanying drawing:—Figure 1 represents, diagrammatically, an apparatus for carrying out my process: Fig. 2 a vertical central section of one of the electrodes forming part thereof; and Fig. 3 a series of equipotential lines as traced on the chart made for and employed in my said process.

For observing the differences of potential due to polarization a movable insulated line L (Fig. 1) is employed containing a sensitive galvanometer G and terminating in two electrodes E and E'. The electrode E is maintained in contact with the soil at a fixed point, but while observing the galvanometer different points of the soil are touched with the other electrode E'. The deviations of the instrument, if any, show the existence of a difference of potential between the two ends of the line and indicates the direction. The electrodes E and E' should be specially produced. It may be remarked indeed that the soil, the electrodes and their line of junction form the circuit of an electric battery, in which the soil, always moist, forms the electrolyte. With ordinary metal electrodes, such as iron stakes, the total electromotive force of such battery would be of the order of some tenths of a volt; moreover it would be essentially variable, the least current traversing the battery polarizes the electrodes by the electrolysis of the absorbed water of the soil. Under these conditions the differences of potential to be observed, which do not themselves exceed some tenths of a volt would be completely masked. In order to remedy this the electrodes E and E' are as described in the application for a United States Patent No. 739,728 of the 2nd January 1913 formed (Fig. 2) of a rod $a$ of pure copper plunged into a saturated solution $b$ of sulfate of copper which is contained in a vessel $c$ of porous earthenware. This alone touches the soil. Under these conditions the total electromotive force of the battery formed by the soil, the electrodes and the junction line, is of the order of a millivolt and remains constant, the electrodes being unpolarizable. A similar result may be attained by replacing the copper with another metal and the sulfate of copper with a salt of such other metal and the porous vessel by an arrangement such that the electrolyte alone comes into direct contact with the soil.

When a prospector in operating as described has by the employment of the means above described discovered a region in which the soil has differences of potential and is consequently affected by the polarization of an ore layer, he draws up the chart of the potentials of this region. For this purpose he traces at the surface of the soil a sufficient number of equipotential lines and numbers such lines according to their potential in the same manner as an ordinary contour map by sketching in the contours of equal altitudes and by numbering these contours according to their altitude. In order to trace the equipotential line passing through a point C (Fig. 3) of the soil the fixed electrode E is maintained in contact with C and while observing the galvanometer G the movable electrode E' is caused to touch the soil at different points P Q R . . . If the point touched is at a potential greater than that of C the galvanometer deviates in a certain direction. It deviates in the opposite direction if the potential is less. A point such as Q equipotential to C and therefore giving no deviation to the galvanometer is thus obtained by trial, the point Q being comprised between the two points P and R which produce deviations in contrary directions. It is only necessary to determine a certain number of points Q Q' Q'', etc., equipotential to C and to map them, to be able to trace upon the chart of potentials the equipotential line passing through C. In order to number the equipotential lines the differences of potential between the various lines traced are measured with a potentiometer inserted in the movable insulated line and inscribed upon the chart of the potentials. It is of advantage with a view of obtaining a clear chart that the fall of potential between contiguous lines shall always be of the same value just as in an ordinary contour map, the difference of altitude between two contiguous contours of altitude is constant. For this purpose the point A of the soil where the potential is maximum is first found, regard being had to the indications of the galvanometer; then by the aid of a potentiometer point B C D . . . are found such that the fall of potential has a constant value, arbitrarily selected in advance between two consecutive points. Lastly equipotential lines are traced passing through B C D . . .

The interpretation of the chart of the potentials with the view of ascertaining the shape and dimensions of the layers must depend in each case on the circumstances and cannot be embodied in a definite formula. It is evident that the general shape of the lines corresponds to a certain degree with the shape of the layer itself, because these lines are only the outcome at the level of the soil of equipotential surfaces which surround the layer in depth.

Claims:

1. The process of determining the location in the sub-soil of ore layers which conduct electricity similarly to a metal, and of determining their shape and size, which comprises observing and measuring at the surface of the soil the differences of potential produced in the soil by said ore layers in their vicinity.

2. The process of determining the location in the sub-soil of ore layers which conduct electricity similarly to a metal, and of determining their shape and size, which comprises observing and measuring at the surface of the soil the differences of potential produced in the soil by said ore layers in their vicinity, plotting a series of equipotential curves based on such observations, and then measuring the differences of potential between these curves.

3. In the art of determining the location in the subsoil of ore layers, an insulated electrically conducting line provided with terminal unpolarizable electrodes adapted to be brought into contact with the soil, in combination with a galvanometer and a potentiometer arranged on the conducting line.

In testimony whereof I have signed this specification in the presence of two subscribing witnesses.

CONRAD SCHLUMBERGER.

Witnesses:
 HANSON C. COXE,
 ALEXIS PETITPICUE.